Feb. 27, 1923.

A. P. D. BELANGER.
DRIER.
FILED JAN. 24, 1921.

Inventor.
Albert P. D. Belanger
By Barnett Truman
Attorneys.

Feb. 27, 1923.
A. P. D. BELANGER.
DRIER.
FILED JAN. 24, 1921.
1,446,869
6 SHEETS—SHEET 5.

Feb. 27, 1923.

A. P. D. BELANGER.
DRIER.
FILED JAN. 24, 1921.

Inventor.
Albert P D Belanger
By Barnes & Inman
Attorneys.

Patented Feb. 27, 1923.

1,446,869

UNITED STATES PATENT OFFICE.

ALBERT P. D. BELANGER, OF CHICAGO, ILLINOIS.

DRIER.

Application filed January 24, 1921. Serial No. 439,648.

*To all whom it may concern:*

Be it known that I, ALBERT P. D. BELANGER, a citizen of the United States, residing at Chicago, in the county of Cook and State of Illinois, have invented certain new and useful Improvements in Driers, of which the following is a specification.

This invention relates to driers and ventilating apparatus.

The invention has for one of its objects to provide an improved method of and apparatus for drying or otherwise treating substances and articles which will dry or otherwise treat the articles with a minimum expenditure of energy and without injuring or impairing the value of the substances dried.

A further object of the invention is to provide apparatus of this character constructed of a plurality of units so that the size and capacity thereof may be varied to suit requirements.

A further object is to provide apparatus in which the loading and unloading of the apparatus may be carried on simultaneously while the apparatus is in operation and without resulting in confusion or interference between these operations.

A still further object is to provide an improved and efficient ventilating device for changing the air in a chamber or other enclosure either to effect drying or ventilation or both.

The invention consists in the novel constructions, combinations and methods to be hereinafter described and claimed for carrying out the above stated objects and such other objects as will appear from the following description.

The invention is illustrated in certain preferred embodiments in the accompanying drawings, in which

Figure 7 is a longitudinal vertical section through the upper portion of the apparatus and through the ventilating apparatus.

Like characters of reference designate like parts in the several figures of the drawings.

Figure 5:
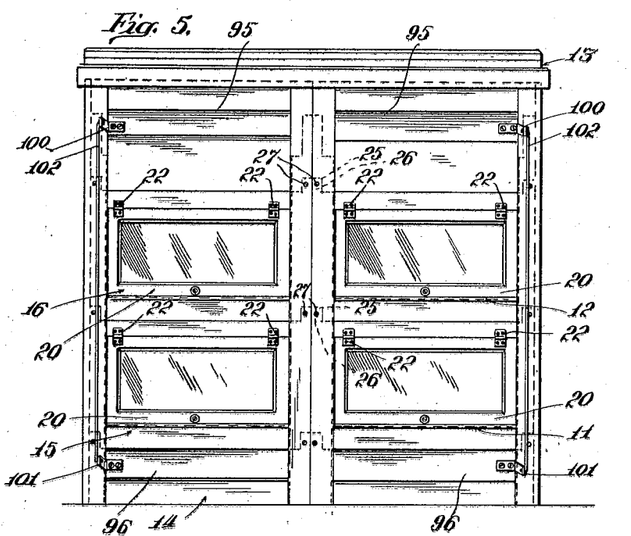
Figure 5 is a front elevation of the apparatus shown in Figure 1.

My improved apparatus comprises a plurality of compartments placed end to end and preferably detachably secured together. In the construction shown, one compartment comprises superposed units 11 and 12 in position on a base 14 and with a top section 13, the other compartment shown comprising superposed units 15 and 16. The base sections 14 are shown formed integrally with the superposed units of each compartment, while in Fig. 5 a single top section 13 is shown extending over the two compartments. In the drawings the front, back and end sections are indicated, respectively, by the numerals 17, 18 and 19, the front and back sections or panels being provided with doors 20 and 21, respectively, hinged along their upper edges at 22. The end pieces 19 consist of side members 23 and cross members 24. Each end piece is of substantially the height of a unit and the side members 23 thereof are notched at 25 (see Fig. 7) so as to fit over the rib 26 on the piece just below. The units are secured together by screws 27 or other suitable fastenings which pass through the front and back sections and into the cross members 24. This construction also serves to secure adjacent compartments together. Preferably the upper and lower edges of the sections 17, 18, etc. are provided with tongue and grooves 28 and 29 so as to provide a tight joint. A panel 30 is preferably provided in each of the end pieces so as to separate the compartments. Each cross member 24 is provided with grooves 31 on opposite sides thereof for supporting trays placed within the various units.

The number and size of the compartments and units may be varied to meet requirements. It is obvious that the size of the apparatus may be increased or diminished whenever desired. It is clear also that numerous changes in the manner of construction of the units and of securing them together may be made without departing from the spirit of the invention.

For the purposes hereinafter pointed out, a longitudinal passage 32 is provided extending throughout the length of the apparatus, such longitudinal passage in the construction shown being at the top of the apparatus. Rails 33 and 34 are provided along the front and the back of the passage 32, respectively, and a rack 35 is provided extending longitudinally a short distance above the rail 34.

Figure 1:
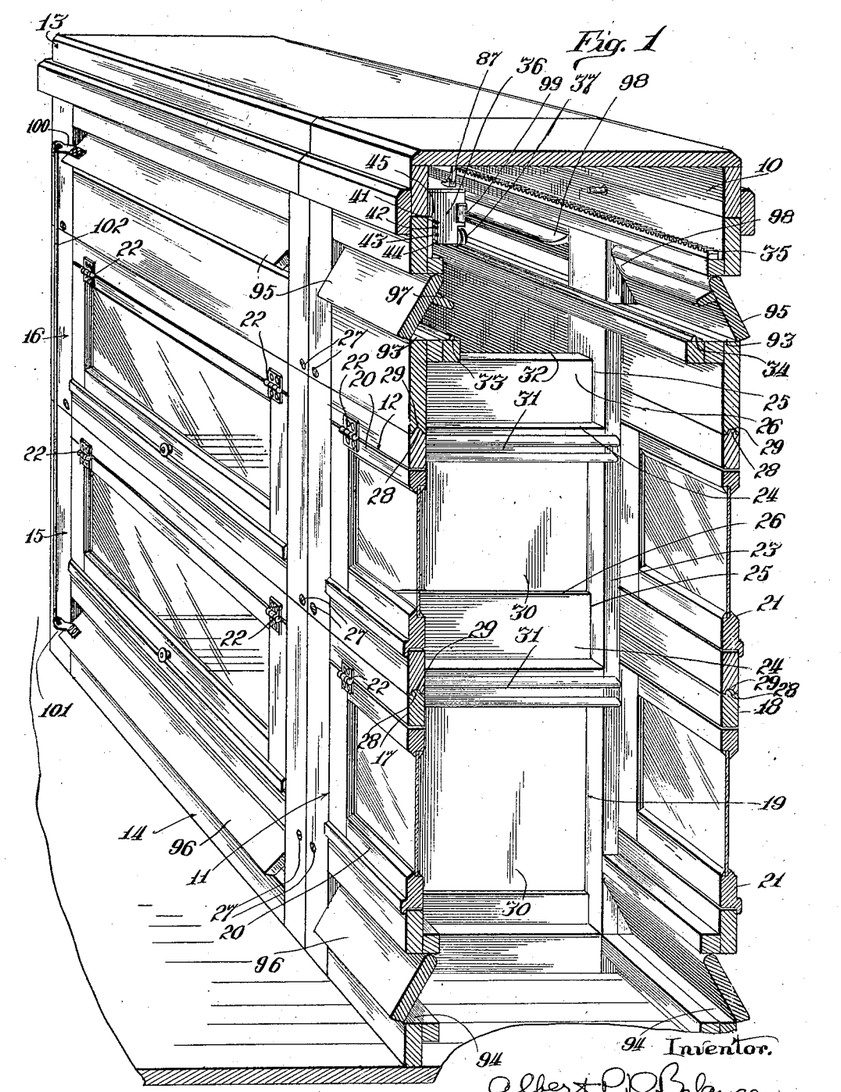
Figure 1 is a sectional perspective of a multiple unit apparatus.
Figure 2:
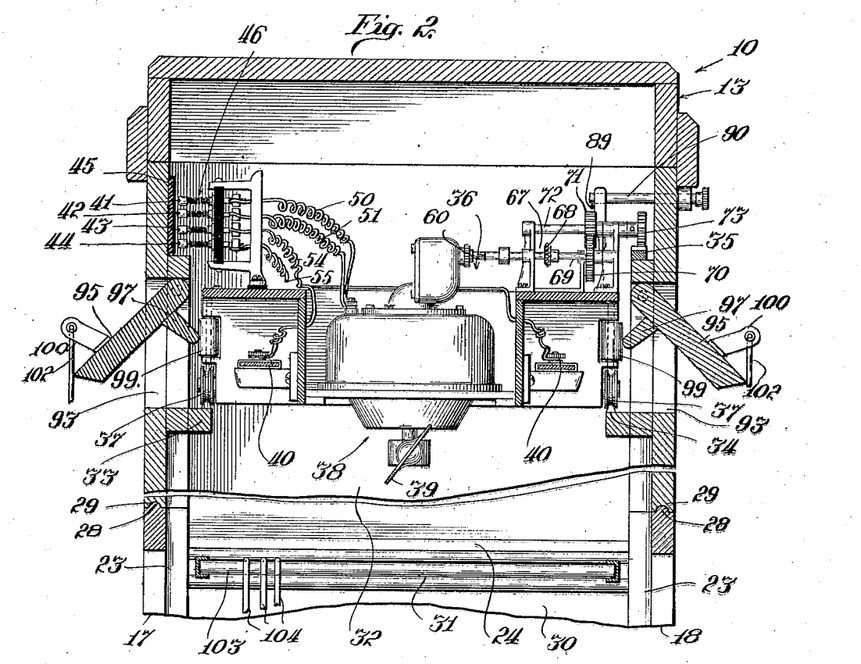
Figure 2 is an enlarged vertical, transverse section of the upper portion thereof.
Figure 3:
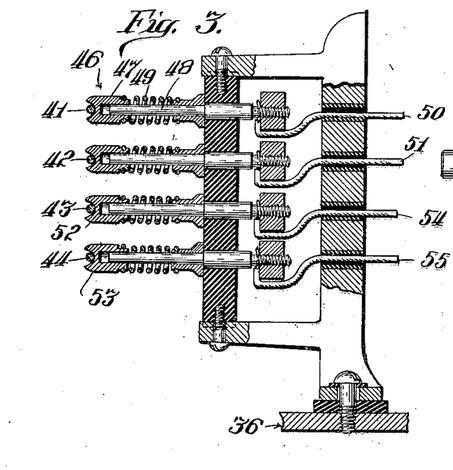
Figure 3 is an enlarged vertical section of the electrical conductors and collectors.

A travelling carrier 36 (see Fig. 2) provided with flanged wheels or rollers 37 and carrying therein an electric fan 38 is adapted to move along the rails 33 and 34. The carrier is of a box like construction, as shown more clearly in Figs. 2, 7 and 8 but the construction thereof may be varied considerably in different types of apparatus. The fan 38 is provided with fan blades 39 rotating in a horizontal plane and adapted to direct a stream of air downwardly through the compartment. For certain purposes the carrier 36 also carries a plurality of electric heaters 40 disposed on opposite sides of the fan and in spaces provided therefor in the carrier, as shown in Fig. 2. The fan motor and the electric heaters are supplied with electric current from electric wires 41, 42, 43 and 44 which are supported within the apparatus in the upper sections thereof, as shown more clearly in Figs. 1 and 2. Preferably, asbestos lining 45 or other suitable insulation is provided in the casing adjacent the wires so as to guard against fire. The wires 41 and 42 are adapted to supply current to the fan through the trolleys 46 supported by the carrier. Each of these trolleys or collectors comprises a grooved member 47 adapted to engage the electric wire and slidably supported on a rod 48 and pressed outwardly by a spring 49. These collectors are individually insulated by suitable insulating substances and are connected by wires 50 and 51 to the fan motor. Similarly collectors 52 and 53 receive current from wires 43 and 44 and conduct the same to the electric heaters. The heaters are connected to the trolleys or collectors by wires 54 and 55. The heaters may be placed either in series or parallel depending on conditions and the voltage of the current supplied. They are illustrated connected in parallel.

The carrier 36 is propelled along its tracks by power derived from the fan motor through reduction gearing. This gearing which may be of any suitable design sufficient to obtain a proper reduction consists of a worm 56 (see Fig. 8) on the fan motor shaft meshing with the worm gear 57 arranged at right angles thereto. The shaft of the worm gear 57 is provided with a worm 58 which in turn meshes with a worm gear 59. The shaft 60 of the worm gear 59 and a shaft 61 are arranged in alignment and so connected as to permit a slight longitudinal movement of the shaft 61. For this purpose the shaft 61 is forked, as shown at 62, and the shaft 61 is provided with a flat portion 63 which extends within the fork 62 so as to turn the shaft 61. The shaft 61 is provided with two opposed bevel gears 64 and 65. These gears are spaced apart and are adapted to be meshed alternatively with the bevel gear 66. The shaft of the bevel gear 66 is provided at its opposite end with another bevel gear 67 which meshes with a bevel gear 68 supported on the shaft 69. The shaft 69 is provided with a spur gear 70 meshing with another spur gear 71 supported on a shaft 72. The shaft 72 is provided with a pinion 73 which meshes with the rack 35 whereby upon the rotation of the pinion 73 through the train of gearing the carrier is moved along the passage 32.

Figure 8:
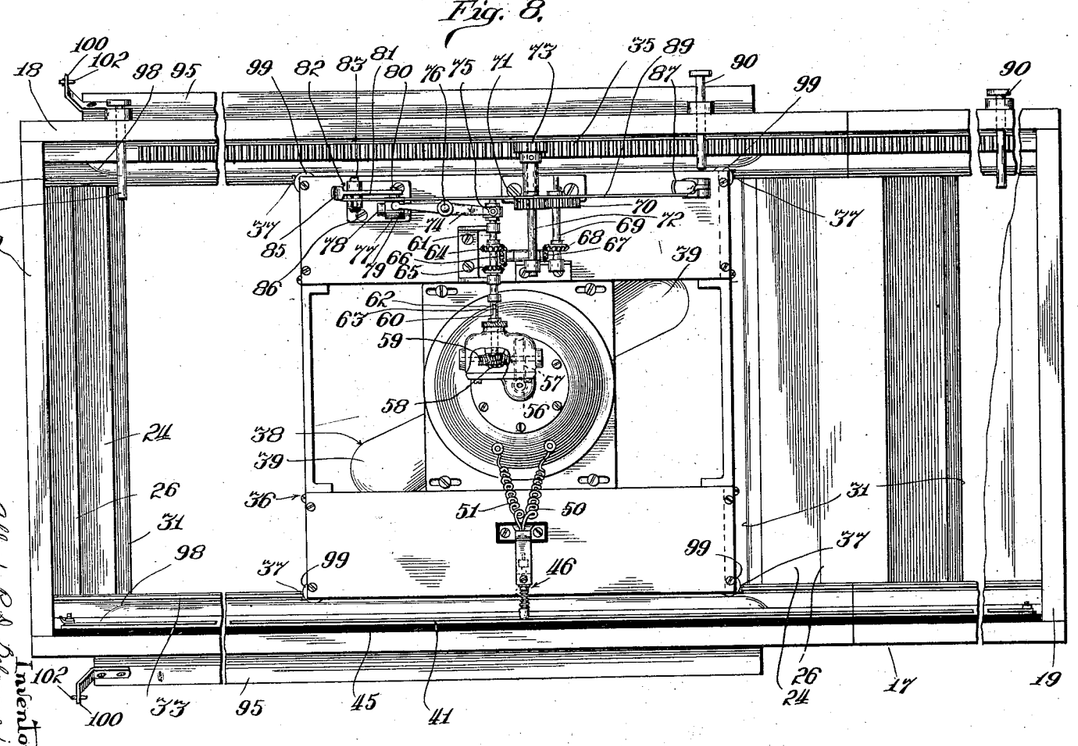
Figure 8 is a fragmentary plan view of the apparatus with the top thereof removed showing particularly the ventilating fan and traveling carrier.

For the purpose of reversing the direction of travel of the carrier without reversing the rotation of the fan, the bevel gears 64 and 65 are adapted to be meshed alternatively with the bevel gear 66. In order to accomplish this the shaft 61 is adapted to be moved back and forth by the lever 74 which is forked at 75 so as to engage between collars on the shaft 61. The lever 74 is pivoted at 76 and is oscillated at its other end by a bell crank 77 rocking in a vertical plane, (see Figs. 7 and 8.) The bell crank 77 is pivoted at 78 and arranged so that one arm 79 extends substantially vertically and the other arm horizontally. The vertical arm 79 is forked and engages the end of the lever 74, as shown in Fig. 8, so as to rock the same. The horizontal arm 80 of the bell crank 77 is oscillated up and down by the forked arm 81 of a bell crank 82. This bell crank is also pivoted so as to rock in a vertical plane but is arranged so that its pivot is at right angles to that of the bell crank 77. This pivot is shown at 83. The other arm 84 of the bell crank is provided with an extension 85. A spring 86 secured to the arm 84 and to the carrier substantially below the pivot 83 of the bell crank is adapted to hold the bell crank 81 in either one or the other of its extreme positions, so that either the gear 64 or the gear 65 is in mesh with the gear 66. Another arm 87 similar to the arm 85, pivoted at 88 to the carrier and connected by the rod 89 to the arm 85 so as to move synchronously therewith, is provided at the opposite side of the fan 38 for throwing the bell-crank 82 in the reverse direction as hereinafter described.

Figure 4:
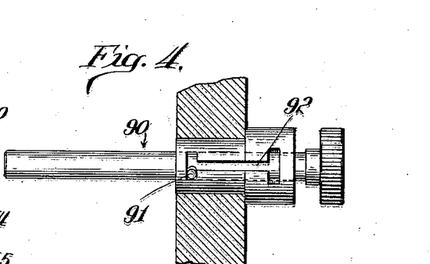
Figure 4 is a detail view showing one of the stops for reversing the travel of the carrier.

Stop pins or reversing pins 90 are provided at the ends of each of the compartments, as is best shown in Fig. 8. These pins are arranged so that they may be withdrawn a short distance, as shown in Fig. 4. A pin 91 and slot 92 are provided so as to hold the pin 90 either in its innermost or in its withdrawn position. When the pin is in its innermost position it is adapted to be engaged by the arms 85 or 87 as the carrier 36 moves along the passage 32, for throwing the bell-crank 82 alternately in opposite directions for causing the reversal of the direction of travel of the carrier 36. Accordingly by controlling the positions of the pins 90 the travel of the carrier back and forth in the apparatus may be limited to one or any number of compartments short of the entire number, or, by moving outwardly all of the pins except the extreme ones, the carrier will travel back and forth throughout the entire apparatus.

Each compartment is provided with air inlets 93 in the upper portion thereof and air outlets 94 in the lower portion. These air openings are normally closed by hinged valves 95 and 96. The upper valves 95 are provided with longitudinal ribs 97 which are rounded or beveled at both ends, as shown at 98. When the carrier 36 enters a compartment vertical rollers 99 mounted on the carrier 36 strike the beveled portions 98 of the ribs and gradually open the upper valves and hold them open as long as the carrier and the fan are in the compartment. The valves 95 are provided with projecting arms 100 which are connected with similar arms 101 on the lower valves 96 by means of rods 102. By means of this arrangement the lower valves of a compartment open simultaneously with the opening of the upper valves.

Operation.—The apparatus may be constructed of any suitable material, such as wood, fiber, metal or even concrete. While I have shown an arrangement comprising detachable units, it will be understood that I do not wish to limit myself to this form except as such form is hereinafter specifically claimed.

The materials or articles to be dried are supported upon racks 103, so as to hang freely in the various units. For the purpose of illustration, I have illustrated a rack comprising a plurality of parallel rods, holding spaghetti or macaroni. The lengths of spaghetti 104 are supported by hanging over the rods which permit them to dry perfectly straight. The racks carrying the articles to be dried are introduced into the various units through the doors on one side of the apparatus and are supported in the grooves 31 in the end pieces. The height of the individual units is made great enough to accommodate the particular articles to be dried when hanging vertically. Different materials, such as hides, and other sheet materials may be supported on racks particularly designed to support them in the proper manner.

With a rack 103 in position in each of the units of a plurality of adjoining compartments, and with the pins 90 arranged for ensuring the reciprocation of the carrier 36 back and forth through such compartments air is drawn into each compartment in turn as the carrier travels through such compartment, being drawn in through the upper inlet opening and driven downwardly by the fan into contact with and past the vertically hanging articles. As the air passes downwardly through the superposed units, it picks up moisture on the surfaces of the articles to be dried and carries such moisture out through the lower air outlets. The effectiveness of the air for taking the moisture is increased in some instances by the heating of the air through the use of the heaters 40, although it is not essential that the heaters 40 be utilized. While I have shown the passage 32 at the top and prefer to employ this arrangement, particularly when it is or may be desired to heat the air, it will be understood that any other suitable arrangement may be employed without departing from the spirit of my invention broadly considered.

Figure 6:
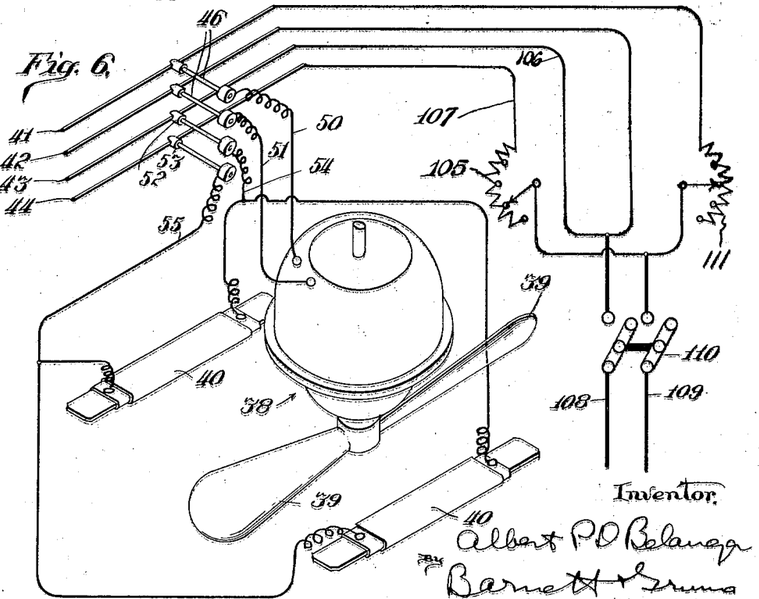
Figure 6 is a perspective view, somewhat diagrammatic in form, of the electrical circuit and electric fan and heating apparatus.

In order to control the temperature to which the air is heated, a rheostat 105 (see Fig. 6) is placed in the electric circuit supplying current to the heater so that the current supplied to the heater may be controlled. Wires 106 and 107 are connected with the line wires 43 and 44. The electric power is supplied through wires 108 and 109. A switch 110 is provided to break the main circuit. In order to control the speed of the carrier through the compartments so as to suit the particular requirements of various materials dried, another rheostat 111 is placed in the electric circuit supplying current to the fan motor. As illustrated in Fig. 6, this rheostat is in parallel with the rheostat 105 and accordingly the fan motor and the heaters may be controlled independently.

As soon as the traveling carrier and fan pass out of one compartment the hinged valves controlling the air inlets and outlets are closed and those of the succeeding compartments are opened. During the time while the carrier is not in a compartment, the moisture in the interior of the material is given an opportunity to travel to the exposed surfaces of the material where it may be evaporated when the fan again enters the compartment.

In the construction illustrated, a single fan is used, extending across the compartment from front to back. I do not limit myself to the use of a single fan, however, except as may be specifically claimed.

The fan is made to travel back and forth intermittently through a compartment for a length of time sufficient to properly dry or otherwise treat the materials therein. When the materials in one unit have been properly dried or treated they are removed through the doors on the side of the apparatus opposite to those through which they were introduced into the unit. This manner of loading and unloading the apparatus prevents confusion and interference between the two operations and permits them to be carried on simultaneously. In other words, a single unit may be filled with fresh trays or racks as soon as the others have been removed, the loading and unloading being carried on without in any way changing the travel or operation of the fan. When it is not desired to employ the entire apparatus, the travel of the fan through one or more of the compartments at either end may be prevented by the proper manipulation of the stop pins 90, as will be readily understood.

Articles such as spaghetti and macaroni may be dried perfectly straight in the apparatus above described. The current of air passing through the rack trays does not tend to bend the free ends and cause the articles to dry in an irregular shape. When the sticks of spaghetti or macaroni are not straight the value thereof is very much decreased and they cannot be made up into package form. Only perfectly straight pieces of spaghetti can be so packed and these claim the highest prices on the market.

Figure 9:
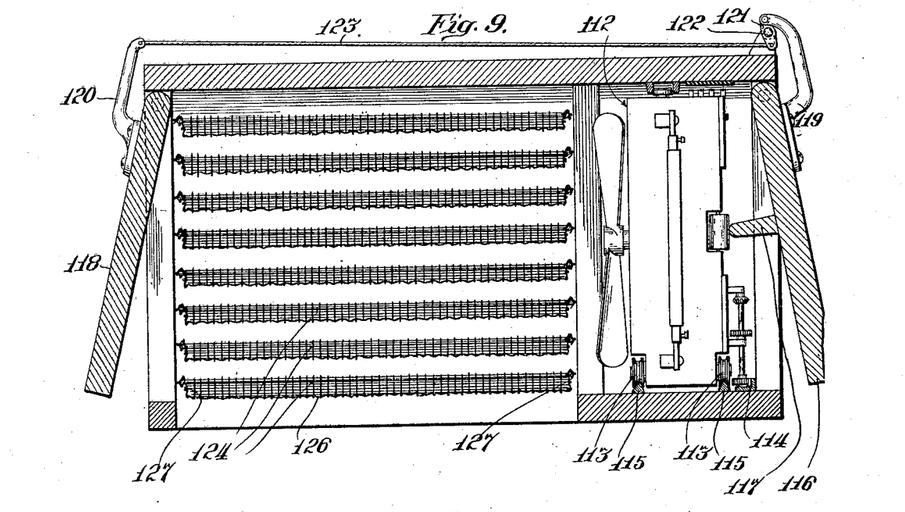
Figure 9 is a modified form of apparatus.

In Fig. 9 I have illustrated a modified form of apparatus which is particularly adapted to dry articles which cannot be hung on racks or which interfere too greatly with the passage of air through the same if the current of air travels in a vertical direction, as in the form of apparatus just described. In the modified form of apparatus, the air travels horizontally through the apparatus. The traveling carrier 112 is in general the same as that previously described with the exception that the shaft of the fan motor is supported in a horizontal position. This requires the rollers or wheels 113 to be placed on the side of the machine, as illustrated. The rack 114 is placed along the bottom of the apparatus parallel with the rails 115 but otherwise occupies the same position relative to the travelling carrier, as in the form previously described. In other respects, the apparatus is just the same. The reversing stops are re-located so as to engage the reversing mechanism on the carrier and the trolley wires are supported along the top of the apparatus.

The door 116 is provided with a longitudinal rib 117 shaped similarly to the rib 97 in the form previously described. This rib is engaged by the carrier as it enters the compartment and opens the door. The opposite door 118 is opened simultaneously by mechanism arranged as follows: The doors are provided with arms 119 and 120 respectively, which extend above the apparatus. The arm 119 operates a small lever 121, pivoted at 122. The opposite end of the lever 121 is connected by means of a flexible connection 123 to the arm 120.

In this form of apparatus the trays carrying the material are introduced and removed from one side of the apparatus through the door 118.

Figures 10, 11:
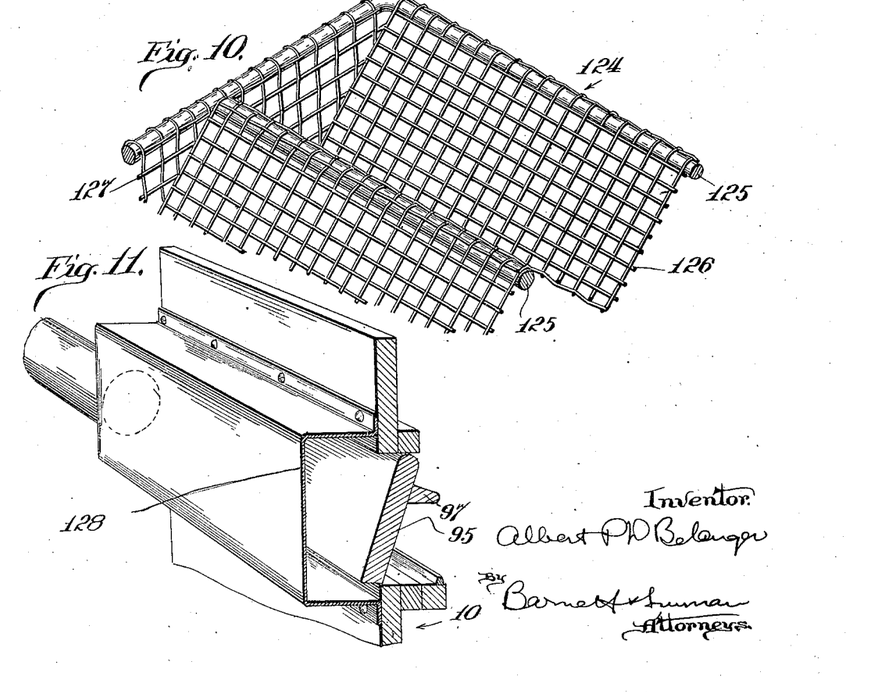
Figure 10 is another form of tray for holding small articles.
Figure 11 is a perspective view of a portion of the apparatus showing a modified air heating construction.

For drying or treating small articles, trays preferably similar to that shown in Fig. 10 are preferably employed. These trays consist of a wire frame 124 of rectangular shape having a plurality of cross wires 125 therein. The tray is covered with wire mesh 126 so arranged that the bottom thereof is of saw-tooth cross section. The ends 127 are also covered with wire mesh. These trays are supported, one above the other, as shown in Fig. 9 with the valleys and ridges of the trays in line with the stream of air set up by the fan. The air is thus able to more readily evaporate the moisture from the bottom as well as the tops of the articles in the trays.

The apparatus may be made of any desirable width and the number of trays on a single layer may be regulated as desired for convenient handling.

In Fig. 11 is illustrated another modified form of apparatus, by means of which the electric heaters may be dispensed with. In this form a channel shaped conduit 128 is placed over the air inlet openings. If the air is drawn in through the upper openings of the apparatus shown in Fig. 1, the conduit is secured over such opening. If, on the other hand, the air is drawn in through the bottom openings, the conduit is placed over such opening. Heated air is supplied to the conduit from any suitable source, although in some instances it is preferable that cooled air be employed in lieu of heated air, as for drying chocolates and other articles which would be injured by the use of warm air or even by air at room temperatures.

It is contemplated also to use the fan and traveling carrier merely as a ventilating unit intended to ventilate a chamber or other enclosure. The travel of the fan over the space insures that all parts thereof will be properly ventilated. Where air is introduced into a chamber for the purpose either of ventilating the same or drying material therein, it is well known that the stream of air does not affect all parts of the space alike. Articles lying directly in the incoming stream are, perhaps, over-dried, while other articles not lying directly in the stream are insufficiently dried. By the use of a traveling ventilating fan the equal treatment of articles in all parts of the enclosure is insured.

I claim:

1. In ventilating apparatus the combination with a chamber having air inlets and air outlets and closure means for said openings, of a movable air changing device supported in said chamber, means for automatically moving said device about in said chamber, and means operatively associated with said device adapted to act on the closure means for said air openings successively for opening closures for the air inlet and outlet nearest adjacent said device for permitting the intake and discharge of air.

2. In ventilating apparatus the combination with a chamber relatively narrow in width and having air inlets and air outlets having gravity closures throughout the length thereof, of a movable air changing device supported in said chamber and adapted to set up a vertically traveling stream of air of substantially the width of said chamber, means for automatically causing said device to travel back and forth throughout the length of said chamber, and means operatively associated with said device for opening the closures for the air inlet and outlet adjacent said device for permitting the intake and discharge of air.

3. An air changing device comprising an electrically driven fan, a traveling carrier for said fan, contact devices on said carrier for conveying electric current to the fan motor, mechanism for propelling said carrier, and a heating device associated with said fan for heating the air passing through said fan.

4. An air changing device comprising an electrically driven fan, a traveling carrier for said fan, contact devices on said carrier for conveying electric current to the fan motor, mechanism for propelling said carrier, and an electrically heated device associated with said fan for heating the air passing through said fan.

5. An air changing device comprising an electrically driven fan, a traveling carrier for said fan, contact devices on said carrier for conveying electric current to the fan motor, mechanism for propelling said carrier, and means on the carrier for heating the air passing through said fan.

6. An air changing device comprising an electrically driven fan, a traveling carrier for said fan, contact devices on said carrier for conveying electric current to the fan motor, mechanism for propelling said carrier, a heating device associated with said fan for heating the air passing through said fan, and means for varying the temperature of said heating device.

7. An air changing device comprising an electrically driven fan, a traveling carrier for said fan, contact devices on said carrier for conveying electric current to the fan motor, mechanism for propelling said carrier, an electrically heated device associated with said fan for heating the air passing through said fan, and means for varying the temperature of said heating device.

8. In ventilating apparatus, the combination with a chamber, of a ventilating fan and a traveling carrier for said fan supported in said chamber and adapted to travel through and out of said chamber, means for delivering power to said fan and for propelling said carrier, and automatically acting means for causing said carrier to travel in the reverse direction into and through said chamber.

9. In ventilating apparatus, the combination with a chamber, of a ventilating fan and a traveling carrier for said fan supported in said chamber and adapted to travel back and forth therein, means for delivering power to said fan and for propelling said carrier, and a plurality of valve controlled inlet and outlet openings in said chamber, and means operatively associated with said carrier for opening the inlet and outlet openings in said chamber opposite the position of said carrier.

10. In a drier, the combination with a drying chamber comprising a plurality of compartments, of a fan provided with a carrier and adapted to travel successively through said compartments, valve controlled air inlets and outlets in each of said compartments and means operated by said carrier for opening the air inlet and outlet valves in a given compartment when said fan enters said compartment.

11. In a drier, the combination with a drying chamber comprising a plurality of compartments, said compartments provided with valve controlled air inlets and outlets, of a fan provided with a carrier and adapted to travel through said compartments and to draw air through the inlet openings and discharge it through said outlets, means for propelling said fan and carrier and means operated by said carrier for opening the inlets and outlets of a given compartment, when said fan enters said compartment.

12. In a drier, the combination with a drying chamber comprising a plurality of compartments, of a fan provided with a carrier supported to travel successively through the upper portions of said compartments, air inlets and outlets in said compartments, said fan adapted to draw air through said inlets and discharge the same through said outlets, and means for propelling said fan and carrier.

13. In a drier, the combination with a drying chamber comprising a plurality of compartments, of a fan provided with a carrier supported to travel successively through the upper portions of said compartments, air inlets and outlets in said compartments, said fan adapted to draw air through said inlets and discharge the same through said outlets, means for propelling said fan and carrier, and means for automatically reversing the travel of said carrier when the same reaches the ends of said chamber.

14. In a drier, the combination with a drying chamber comprising a plurality of compartments, of a fan provided with a carrier supported to travel successively through the upper portions of said compartments, air inlets and outlets in said compartments, said fan adapted to draw air through said inlets and discharge the same through said outlets, means for causing said carrier to move back and forth through said compartments and means for automatically reversing the travel of said carrier in any desired compartment.

15. In a drier, the combination with a drying chamber comprising a plurality of compartments, of a fan provided with a carrier supported in said chamber and adapted to travel successively through the upper portions of said compartments, air inlets and outlets in said compartments, said fan adapted to draw air through said inlets and discharge the same through said outlets, air heaters associated with said fan and adapted to heat the air drawn into said compartments, and means for propelling said fan and carrier.

16. In a drier, the combination with a drying chamber comprising a plurality of compartments, of a fan provided with a carrier supported in said chamber and adapted to travel successively through the upper portions of said compartments, upper air inlets anl lower air outlets in said compartments, an air heater associated with said carrier, said fan adapted to draw air in through said upper air inlet and discharge the same through said lower air outlet, and means for propelling said fan and carrier.

17. In a drier, the combination with a drying chamber comprising a plurality of compartments, of a fan provided with a carrier supported in said chamber and adapted to travel successively through the upper portions of said compartments, value controlled air inlets and outlets in the upper and lower portions of said compartments, respectively, means operated by said carrier for opening said valves in a given compartment when the fan enters said compartment, said fan being so disposed as to draw in air through said inlets and expel the same through said outlets, an air heater for heating the incoming air, and means for propelling said fan and carrier.

18. In a drier, the combination with a drying chamber comprising a plurality of compartments, of a fan provided with a carrier supported in said chamber and adapted to travel successively through the upper portions of said compartments, valve controlled air inlets and outlets in the upper and lower portions of said compartments, respectively, and on both sides thereof, means operated by said carrier for opening said valves in a given compartment when the fan enters said compartment, said fan being so disposed as to draw in air through said inlets and expel the same through said outlets, and air heaters on opposite sides of said fan and in the path of the incoming air for heating said air.

19. In a drier, the combination with a drying chamber comprising a plurality of compartments, of an electrically driven fan provided with a carrier supported in said chamber and adapted to travel successively through the upper portions of said compartments, and mechanism operated by said fan for propelling said carrier, valve controlled air inlets and outlets in the upper and lower portions of said compartments, respectively, means operated by said carrier for opening said valves in a given compartment when the fan enters said compartment, said fan being so disposed as to draw in air through said inlets and expel the same through said outlets, an electric heater for heating the incoming air, electrical conductors in said compartments, and electrical collectors on said carrier and contacting with said conductors for carrying electric current to said fan and heater.

20. In a drier, the combination with a drying chamber comprising a plurality of compartments, of an electrically driven fan provided with a carrier supported in said chamber and adapted to travel successively through the upper portions of said compartments, and mechanism operated by said fan for propelling said carrier, valve controlled air inlets and outlets in the upper and lower portions of said compartments, respectively, means operated by said carrier for opening said valves in a given compartment when the fan enters said compartment, said fan being so disposed as to draw in air through said inlets and expel the same through said outlets, electric heaters on opposite sides of said fan in the path of the incoming air for heating said air, electrical conductors in said compartments, and electrical collectors on said carrier and contacting with said conductors for carrying electric current to said fan and heater.

21. In a drier, the combination with a drying chamber comprising a plurality of compartments, of an electrically driven fan provided with a carrier supported in said chamber and adapted to travel successively through the upper portions of said compartments, mechanism operated by said fan for propelling said carrier, valve controlled air inlets and outlets in the upper and lower portions of said compartments, respectively, means operated by said carrier for opening said valves in a given compartment when the fan enters said compartment, said fan being so disposed as to draw in air through said inlets and expel the same through said outlets, an electric heater for heating the incoming air, electrical conductors in said compartments, electrical collectors on said carrier and contacting with said conductors for carrying electric current to said fan and heater, and means for independently controlling the current supplied to said fan and air heater.

22. In a drier, the combination with a drying chamber comprising a plurality of compartments, of a fan provided with a carrier supported in said chamber and adapted to travel successively through the upper portions of said compartments, upper air inlets and lower air outlets in said compartments, an air heater associated with said carrier, said fan adapted to draw air through said upper inlets and expel the same through said lower outlets and means for heating the incoming air.

23. In a drier, the combination with a drying chamber comprising a plurality of compartments, of a fan provided with a carrier supported in said chamber and adapted to travel successively through the upper portions of said compartments, upper air inlets and lower air outlets in said compartments, an air heater associated with said carrier, said fan adapted to draw air through said upper inlets and expel the same through said lower outlets and means for supplying heated air to said fan.

24. Apparatus of the class described comprising in combination a plurality of compartments detachably secured together and having in their upper portions a communicating passage, and means in said passage for permitting a device to travel through said compartments.

25. Apparatus of the class described comprising in combination a plurality of compartments detachably secured together and having a communicating passage, each compartment having valve controlled air inlets and outlets therein, and means in said passage for permitting a device to travel through said compartments.

26. Apparatus of the class described comprising in combination a plurality of compartments detachably secured together and having a communicating passage, each compartment having valve controlled air inlets and outlets in their upper and lower portions respectively, and means in said passage for permitting a device to travel through said compartments.

27. Apparatus of the class described comprising in combination a plurality of compartments detachably secured together and having a communicating passage, each compartment having valve controlled air inlets and outlets in their upper and lower portions respectively, and means for permitting a moving air changing device to travel from one compartment to the other.

28. Apparatus of the class described comprising in combination a plurality of compartments detachably secured together and having a communicating passage, each compartment having air inlets and outlets, valves for said inlets and outlets and mechanism connecting the same whereby the inlets and outlets of a given compartment may be operated simultaneously.

29. Apparatus of the class described comprising in combination a plurality of compartments detachably secured together, each compartment comprising a plurality of superposed units open at the top and bottom, said compartments having a communicating passage.

30. Apparatus of the class described comprising in combination a plurality of compartments detachably secured together, each compartment comprising a plurality of superposed units open at the top and bottom, said compartments having a communicating passage above said units and provided with means for permitting a carrier to travel therein.

31. Apparatus of the class described comprising in combination a plurality of compartments detachably secured together, each compartment comprising a plurality of superposed units open at the top and bottom, and having means therein for supporting articles to be treated, and having doors in their sides.

32. Apparatus of the class described comprising in combination a plurality of compartments detachably secured together, each compartment comprising a plurality of superposed units open at the top and bottom, and having means therein for supporting articles to be treated, and having doors in their opposite sides.

33. Apparatus of the class described comprising in combination a plurality of independent compartments detachably secured together and having a communicating passage, means in said passage for permitting a device to travel through said compartments, each compartment comprising a plurality of superposed units open at their tops and bottoms, provided with transparent doors on opposite sides and having means therein for supporting articles.

34. Apparatus of the class described comprising in combination a plurality of independent compartments detachably secured together and having a communicating passage, means in said passage for permitting a device to travel through said compartments, each compartment comprising a plurality of superposed units open at their tops and bottoms, provided with transparent doors on opposite sides and having guideways therein for supporting trays.

35. In a drier, in combination with a drying chamber comprising a plurality of compartments, each compartment having doors in the sides thereof and provided with means therein for supporting trays, of a fan provided with a carrier and adapted to travel successively through said compartments, valve controlled air inlets and outlets in each of said compartments and means operated by said carrier for opening the air inlet and outlet valves in a given compartment when said fan enters said compartment.

36. Drying apparatus comprising in combination a plurality of compartments placed end to end and having a communicating passage therethrough, each compartment comprising a plurality of superposed units open at their tops and bottoms and having end pieces therein adapted to telescope into the corresponding units of adjacent compartments, said compartments being detachably secured together by fastenings engaging with said end pieces.

37. Drying apparatus comprising in combination a plurality of compartments placed end to end and having a communicating passage therethrough, each compartment comprising a plurality of superposed units open at their tops and bottoms, and a top and bottom section, said sections provided with ventilating openings provided with hinged valves, said valves having rocking arms and a rod connecting said arms whereby said valves may be operated simultaneously.

38. Drying apparatus comprising a compartment, and automatically controlled means for forcing a stream of air at intervals only through said compartment.

39. Drying apparatus comprising a chamber made up of a series of separate compartments, and means for forcing a stream of air through the several compartments in turn.

40. Drying apparatus comprising a chamber made up of a series of separate compartments, and automotically controlled means acting upon the several compartments successively at predetermined intervals for forcing a stream of air through each compartment in turn.

41. Drying apparatus comprising a chamber made up of a series of separate compartments with a passage way opening into the several compartments, a carrier movable along said passage way, an air changing device mounted on said carrier, and means for moving said carrier along said passage way for forcing a stream of air through the several compartments in succession.

42. Drying apparatus comprising a chamber made up of a series of separate compartments with a passage way opening into the several compartments, a carrier movable along said passage way, an air changing device mounted on said carrier, and automatically acting means for moving said carrier back and forth along said passage way at a regular rate for forcing a stream of air through the several compartments in succession at predetermined intervals.

43. Drying apparatus comprising a compartment having an outlet port, closure means for said port, means acting intermittently in said compartment for forcing a stream of air through the compartment, and means acting independently of the stream of air but in similarly timed relation for opening said closure means for the escape of the air from said chamber.

44. Drying apparatus comprising a series of compartments each having an outlet port, closure means for said ports, means acting successively and intermittently in the several compartments for forcing a stream of air through the compartments, and means for opening the closure means of each compartment in succession as the stream of air is established in such compartment.

45. Drying apparatus comprising a compartment having inlet and outlet ports at opposite points, closure means for said ports, means acting intermittently in said compartments for forcing a stream of air through each compartment in turn from said inlet port to said outlet port, and means acting independently of the stream of air but in similarly timed relation for opening said closure means.

46. Drying apparatus comprising a chamber made up of a series of separate compartments with a passage way opening into the several compartments, a carrier movable along said passage way, an air changing device mounted on said carrier, inlet and outlet ports at opposite points in each of said compartments, means for closing said ports, means for moving said carrier along said passage way for forcing a stream of air through each compartment in turn from the inlet port of said compartment to the outlet port thereof, and means for opening the ports in each compartment in turn as the carrier enters the compartment and for again closing the ports as the carrier is withdrawn from the compartment.

47. Drying apparatus comprising a chamber made up of a series of separate compartments with a passage way opening into the several compartments, a carrier movable along said passage way, an air changing device mounted on said carrier, inlet and outlet ports at opposite points in each of said compartments, means for closing said ports, means for moving said carrier along said passage way for forcing a stream of air through each compartment in turn from the inlet port of said compartment to the outlet port thereof, and means actuated by the carrier in its movement along said passage way for holding the port of each compartment open during the passage of the carrier therethrough.

48. Drying apparatus comprising a chamber made up of a series of separate compartments with a passage way opening into the several compartments, a track along said passage way, a wheeled truck movable along said track, an air changing device mounted on said truck, and means for moving said truck back and forth along said track for carrying the air changing device successively into position opposite the several compartments.

49. Drying apparatus comprising a chamber made up of a series of separate compartments with a passage way opening into the several compartments, a track along said passage way, a rack extending along said track, a wheeled truck movable along said track, a gear mounted on said truck adapted by engagement with the rack to move the truck along the track, and an air changing device mounted on said truck adapted to be carried successively into the several compartments for forcing a stream of air successively through said compartments.

50. The method of changing air in a space which consists in introducing air into a space at a given point, removing the same at an opposite point, and moving the point of introduction of air and simultaneously the point of discharge so as to affect all parts of the space.

51. The method of changing air in a space which consists in introducing a stream of air into the same and discharging the same at a point opposite and moving said stream of air uniformly parallel to itself and correspondingly changing the point of discharge so as to affect all parts of said space.

52. The method of drying which consists in passing a stream of air of limited dimensions compared to the drying space over the articles in a certain portion of said space, protecting portions of the space from the stream delivered to other portions, and moving said stream about said space so as to equally treat the articles in all portions of said space.

53. The method of drying which consists in intermittently at regular predetermined intervals directing a stream of air over the articles to be dried.

54. The method of drying which consists in periodically directing a stream of air over the articles to be dried, and alternately maintaining the body of air at rest about the articles.

55. The method of drying which consists in directing a stream of air over the articles to be dried, alternately protecting the particles from moving air for permitting the moisture on the interior of said articles to travel to the exposed surfaces, and again directing a stream of air over said articles and repeating the operation until the articles are dried.

56. The method of treating articles in a chamber which consists in drawing air into said chamber, heating the same and directing a stream of heated air for a limited time over the articles in one portion of said space and permitting said air then to escape from said chamber, then causing the stream of air to act on articles in another portion of said chamber and thereafter repeating the operation until all of the articles are properly treated.

57. The method of drying articles in a chamber which consists in drawing air into said chamber, heating the same and directing a stream of heated air for a limited time over the articles in one portion of said space and permitting said air to then escape from said chamber, then causing the stream of air to act on articles in another portion of said chamber and thereafter repeating the operations until all the articles are properly dried.

58. The method of drying articles which consists in supporting the same in a drying chamber so that a stream of air may be passed freely between the articles, drawing air into said chamber from one side or wall and directing a stream of such air between said articles in one portion of the chamber and permitting the air to pass out of the chamber after it has traversed the articles in said portion of the chamber, then similarly treating the articles in another portion of said chamber and repeating the operation by intermittently passing the air over the articles until the same have been properly dried.

ALBERT P. D. BELANGER.